United States Patent
Deshpande

(10) Patent No.: US 9,925,979 B2
(45) Date of Patent: Mar. 27, 2018

(54) AUTONOMOUS BRAKING FAILURE MANAGEMENT IN PEDESTRIAN PROTECTION

(71) Applicant: Robert Bosch GmbH, Stuttgart (DE)

(72) Inventor: Anup Deshpande, Troy, MI (US)

(73) Assignee: Robert Bosch GmbH, Stuttgart (DE)

( * ) Notice: Subject to any disclaimer, the term of this patent is extended or adjusted under 35 U.S.C. 154(b) by 16 days.

(21) Appl. No.: 15/173,822

(22) Filed: Jun. 6, 2016

(65) Prior Publication Data
US 2017/0349169 A1  Dec. 7, 2017

(51) Int. Cl.
| | |
|---|---|
| G08G 5/00 | (2006.01) |
| B60W 30/09 | (2012.01) |
| B60W 10/18 | (2012.01) |
| B60W 10/20 | (2006.01) |

(52) U.S. Cl.
CPC ......... B60W 30/09 (2013.01); B60W 10/18 (2013.01); B60W 10/20 (2013.01); *B60W 2420/42* (2013.01); *B60W 2420/52* (2013.01); *B60W 2520/10* (2013.01); *B60W 2540/12* (2013.01); *B60W 2540/18* (2013.01); *B60W 2550/10* (2013.01); *B60W 2710/18* (2013.01); *B60W 2710/20* (2013.01)

(58) Field of Classification Search
CPC ...... G01S 13/931; G01S 13/867; G01S 13/66; G01S 2013/9346; G01S 2013/9367; G01S 2013/9375; G08B 21/22
USPC ........... 701/41, 36, 45; 340/961, 988, 686.6
See application file for complete search history.

(56) References Cited

U.S. PATENT DOCUMENTS

| | | | |
|---|---|---|---|
| 6,085,151 A | 7/2000 | Farmer et al. | |
| 6,226,389 B1* | 5/2001 | Lemelson | G01S 13/931 382/104 |
| 6,856,906 B2 | 2/2005 | Winner et al. | |
| 8,090,537 B2 | 1/2012 | Nishira et al. | |
| 2004/0122573 A1* | 6/2004 | Mizutani | B60T 7/22 701/45 |
| 2009/0192710 A1* | 7/2009 | Eidehall | B62D 15/0265 701/301 |
| 2010/0063736 A1 | 3/2010 | Hoetzer | |
| 2013/0218433 A1 | 8/2013 | Matsuno | |

(Continued)

FOREIGN PATENT DOCUMENTS

EP 2990291 A2 3/2016

*Primary Examiner* — Dalena Tran
(74) *Attorney, Agent, or Firm* — Michael Best & Friedrich, LLP

(57) ABSTRACT

A collision avoidance system and method for a vehicle. The system includes a video camera and a distance sensor. The system includes a driver control, a vehicle control system, and a controller. The controller is communicatively coupled to the video camera, the distance sensor, the driver control, and the vehicle control system. The controller receives a first signal from the video camera indicative of the presence of the pedestrian and receives a second signal from the distance sensor indicative of the presence of the pedestrian. The controller determines a course deviation from a current path of travel of the vehicle and activates a timer. The controller resets the timer when the driver control receives an input from the driver that is above a threshold. When the driver input is below the threshold and the timer expires, the controller applies the course deviation using the vehicle control system.

21 Claims, 6 Drawing Sheets

(56) References Cited

U.S. PATENT DOCUMENTS

2014/0049646 A1 2/2014 Nix
2015/0329112 A1 11/2015 Jeon et al.
2015/0353062 A1* 12/2015 Breuer ..................... B60T 7/22
                                                                          701/70

* cited by examiner

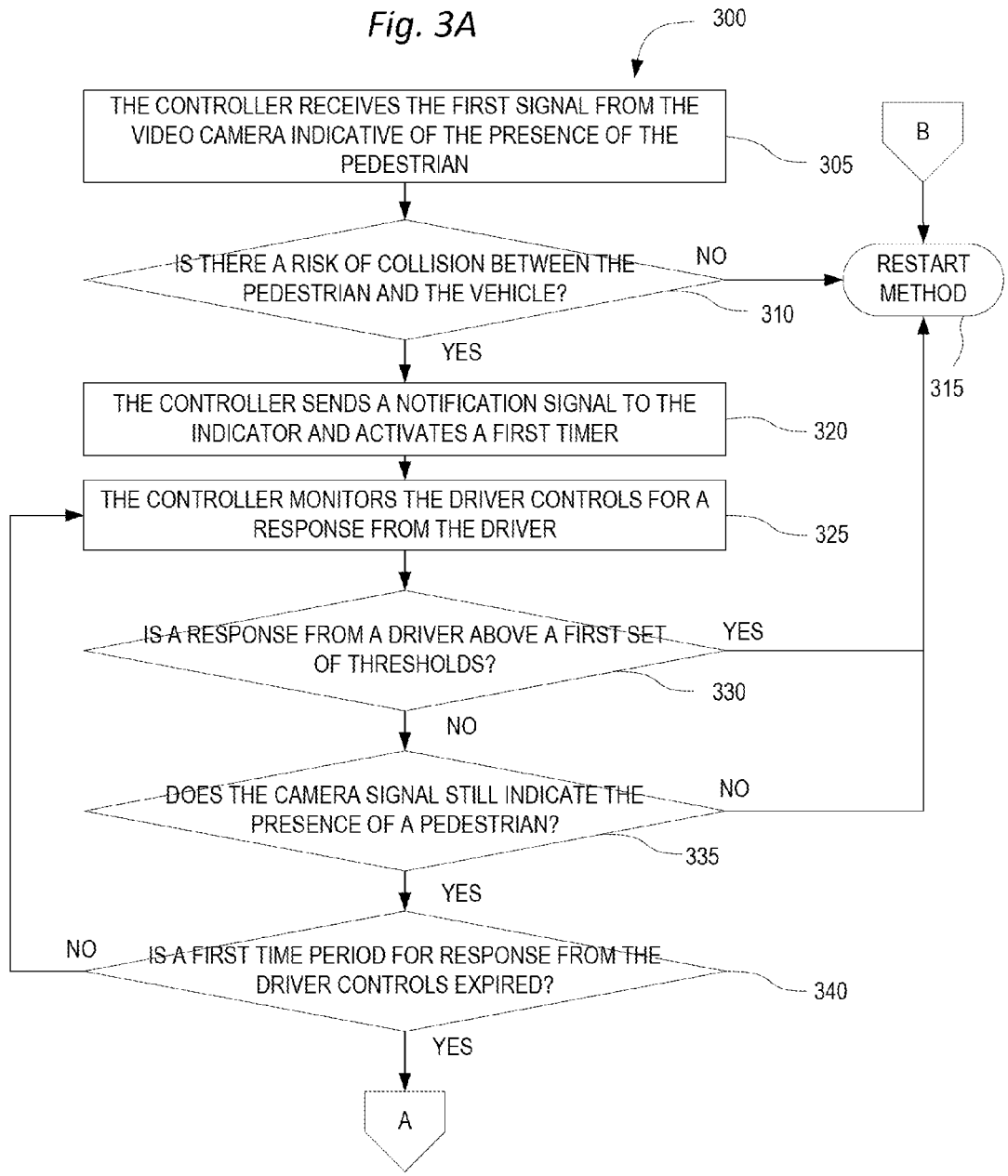

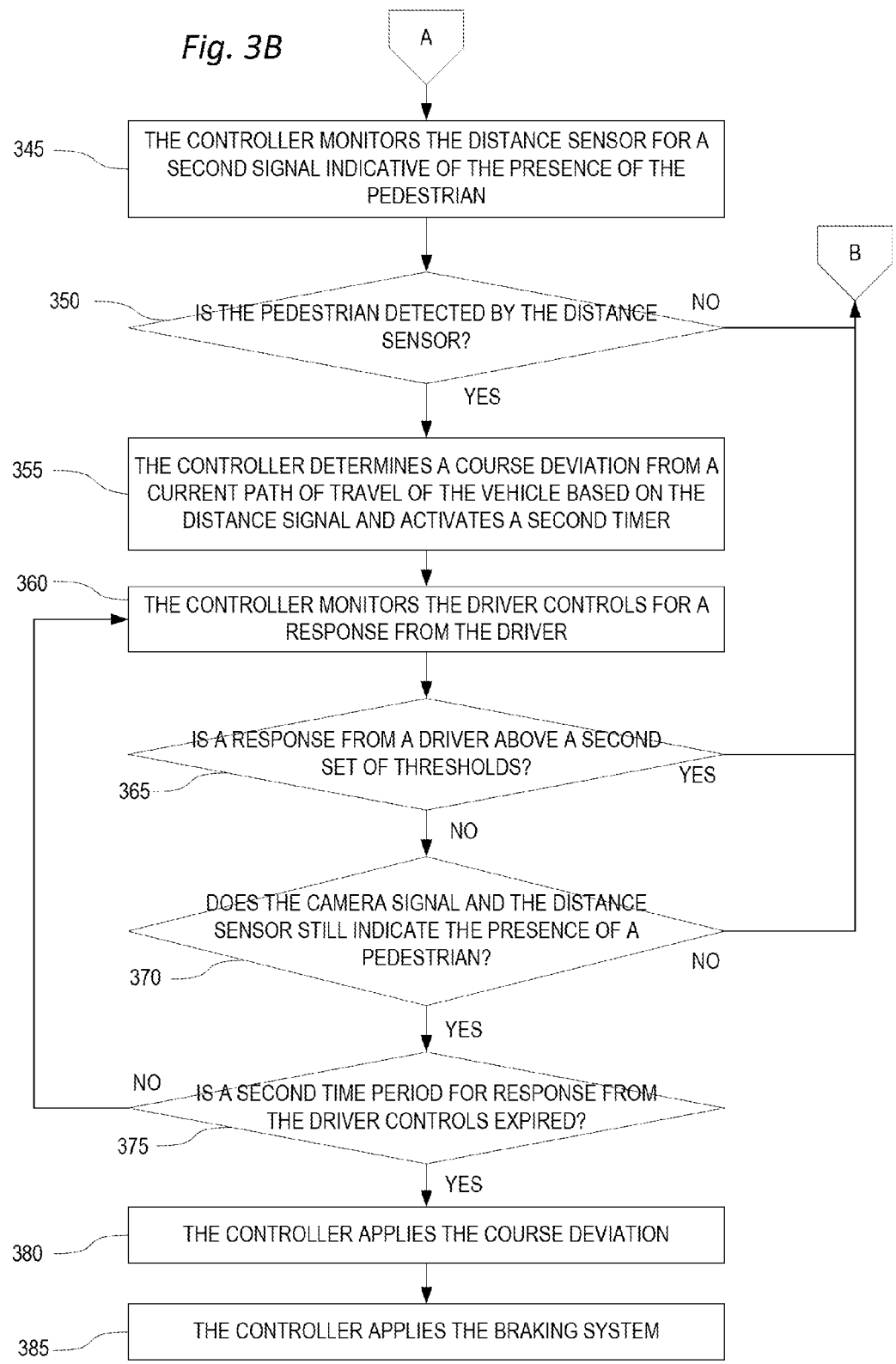

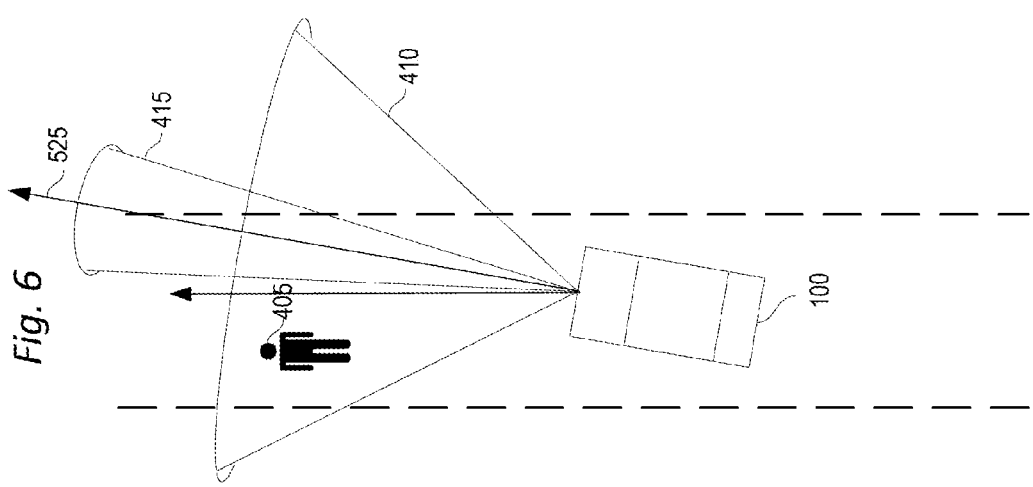

AUTONOMOUS BRAKING FAILURE MANAGEMENT IN PEDESTRIAN PROTECTION

FIELD

Embodiments relate to automated vehicle control systems.

BACKGROUND

Modern vehicles are being equipped with various types of driver assistance systems with sensors and video cameras to assist a driver of the vehicle. In some designs, driver assistance systems provide automated stopping in emergency situations. For example, when a pedestrian is detected by the driver assistance system and the system determines that there is a probability of collision, the driver assistance system may slow or stop the vehicle to avoid collision with the pedestrian. However, these designs may overreact to the presence of the pedestrian and startle the driver or the pedestrian. For example, when a pedestrian approaches a roadway while moving perpendicular to the vehicle, the driver assistance systems may perform a sudden brake even though the pedestrian may stop at the edge of the roadway (for example, at the curbside). In these designs, the driver assistance systems may be tuned to react slower to avoid overreactions. However, in these cases, the vehicle may not be able to stop in time to avoid the pedestrian in cases where the pedestrian continues in a path that intersects with the path of the vehicle.

SUMMARY

Embodiments of the invention provide, among other things, a system and a method of collision avoidance that provide an integrated approach to the above-listed problems.

One embodiment provides a collision avoidance system for a vehicle. In one example, the collision avoidance system includes a video camera configured to detect the presence of the pedestrian and a distance sensor configured to detect a presence of a pedestrian. The collision avoidance system also includes a driver control configured to receive an input from a driver, a vehicle control system configured to automatically maneuver the vehicle, and a controller including an electronic processor and a memory. The controller is communicatively coupled to the video camera, the distance sensor, the driver control and the vehicle control system. The controller is configured to receive a first signal from the video camera indicative of the presence of the pedestrian and receive a second signal from the distance sensor indicative of the presence of the pedestrian. The controller is further configured to determine a course deviation from a current path of travel of the vehicle and activate a timer when the presence of the pedestrian is detected by both the video camera and the distance sensor. The controller resets the timer when the driver control receives an input from the driver that is above a threshold. When the driver input is below the threshold and the timer expires apply the course deviation using the vehicle control system.

Another embodiment provides a method of performing collision avoidance for a vehicle. In one example, the method includes receiving, at a controller, a first signal from a video camera indicative of a presence of the pedestrian and a second signal from a distance sensor indicative of the presence of the pedestrian. The controller determines a course deviation from a current path of travel of the vehicle and activates a timer when the presence of the pedestrian is detected by both the video camera and the distance sensor. The controller resets the timer when a driver control receives an input from the driver that is above a threshold and applies the course deviation using a vehicle control system when the driver input is below the threshold and the timer expires.

BRIEF DESCRIPTION OF THE DRAWINGS

FIGS. 3A and 3B are flowcharts of a method of operating the pedestrian avoidance system of FIG. 1 according to one embodiment.

FIG. 6 is a diagram of a driving scenario where the vehicle performs evasive action based on the pedestrian avoidance system of FIG. 1.

DETAILED DESCRIPTION

Before any embodiments are explained in detail, it is to be understood that the invention is not limited in its application to the details of construction and the arrangement of components set forth in the following description or illustrated in the following drawings. Embodiments are capable of being practiced or of being carried out in various ways.

A plurality of hardware and software based devices, as well as a plurality of different structural components may be used to implement the invention. In addition, embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. As such, a plurality of hardware- and software-based devices, as well as a plurality of different structural components may be utilized to implement embodiments of the invention. For example, "control units" and "controllers" described in the specification can include one or more processors, one or more memory modules including non-transitory computer-readable medium, one or more input/output interfaces, and various connections (for example, a system bus) connecting the components.

Figure 1:
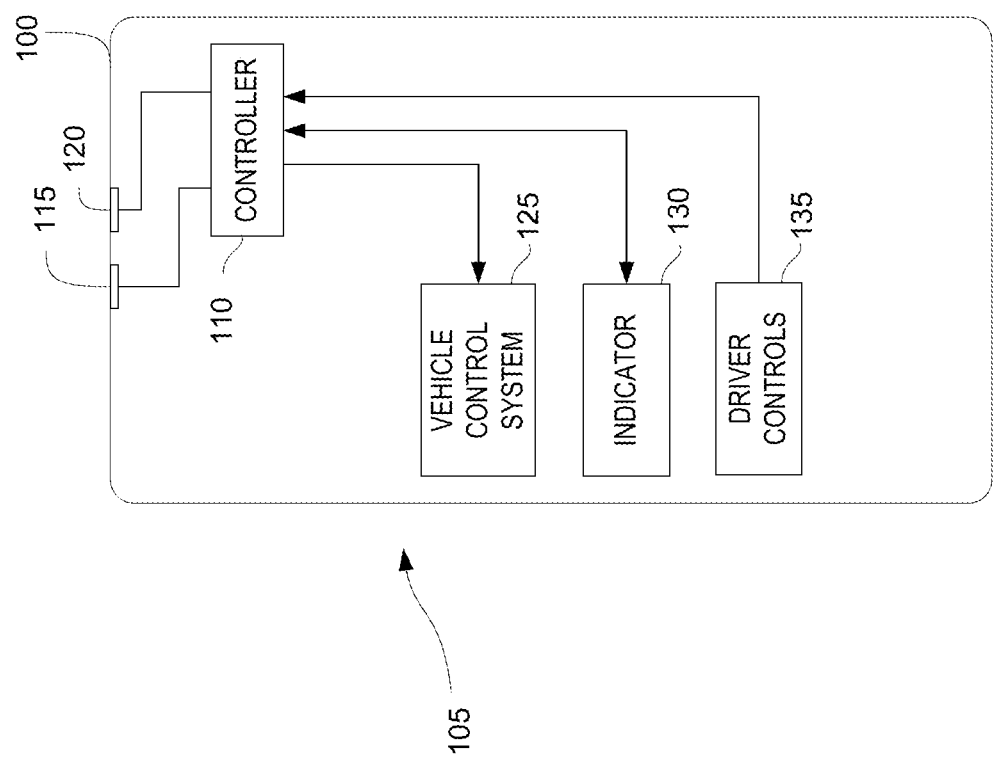
FIG. 1 is a diagram of a vehicle equipped with a pedestrian avoidance system according to one embodiment.

FIG. 1 illustrates a vehicle 100 equipped with a pedestrian avoidance system 105. In the example illustrated, the pedestrian avoidance system 105 includes a controller 110, a video camera 115, a distance sensor 120, a vehicle control system 125, an indicator 130, and driver controls 135. The vehicle 100 may be of various types including an automobile, a truck, a semi-tractor, and the like. Components of the pedestrian avoidance system 105 may be incorporated into one or more electronic control units of the vehicle 100. FIG. 1 provides one illustrative example of the pedestrian avoidance system 105. However, other configurations and constructions other than those illustrated and described herein are possible.

The components of the pedestrian avoidance system 105 may be of various types. For example, the video camera 115 may be mounted inside or outside a front of the vehicle 100 and be configured to capture images of a forward field of view at various rates and qualities. The video camera 115 may detect and, in some embodiments, identify and classify objects such as pedestrians. The video camera 115 transmits a video signal and may transmit associated information relating to detected objects and pedestrians to the controller 110. In some embodiments, a sensor other than a video camera may be used in place of the video camera 115 to perform the functionality described herein. For example, a second distance sensor (for example, a radar sensor) may be used in place of the video camera 115.

Similarly, the distance sensor 120 may be of various types. The distance sensor 120 may incorporate various technologies including radio detection and ranging (i.e., radar) or light detection and ranging (i.e., lidar). In some embodiments, the distance sensor 120 is adapted to determine a distance between the vehicle 100 and detected objects, the position of the detected objects, and the velocity of the detected objects relative to the vehicle 100. In some embodiments, the video camera 115 and the distance sensor 120 may be incorporated into a single sensor that performs all or some of the functionality of the video camera 115 and the distance sensor 120. For example, in some embodiments, a single sensor may sense distance, direction, and velocity of a pedestrian and enable performance of the methods discussed herein.

The vehicle control system 125 may also be of various types. For example, in some embodiments, the vehicle control system 125 includes a braking controller or braking actuator that is capable of applying braking force to wheels of the vehicle 100. In some embodiments, the vehicle control system 125 is capable of applying differential braking to each of the wheels based on a signal from the controller 110. In these embodiments, the vehicle control system 125 may apply an unevenly distributed braking force to alter a direction of the vehicle 100 based on a signal from the controller 110. In some embodiments, the vehicle control system 125 includes a steering controller that provides automated steering control. For example, the vehicle control system 125 may be configured to automatically change the direction of the vehicle 100 based on a signal from the controller. In some embodiments, the vehicle control system 125 is configured to both apply differential braking and steering. As a consequence, the vehicle control system 125 may be configured to change the direction of travel and the speed of the vehicle 100 based on the signal from the controller 110 using a combination of differential braking, straight-line braking, and steering.

The indicator 130 may include various mechanisms to provide notifications to the driver of the vehicle 100. For example, the indicator 130 may include a visual indicator such as an icon on a graphical display or a light (for example, LED). In some embodiments, the indicator 130 may include one or more of a visual indicator, an audio indicator, and a haptic indicator. In some embodiments, the indicator 130 is included within a Heads Up Display (HUD). The indicator 130 is configured to generate a warning for the driver when the indicator 130 receives a notification signal from the controller 110. In some embodiments, the indicator 130 is included within a graphical user interface (GUI) or a human-machine interface (HMI).

The driver controls 135 may also include various types of inputs for the vehicle 100. In some embodiments, the driver controls 135 include sensors that sense inputs from a driver for the vehicle 100. For example, the driver controls 135 may include a steering angle sensor, a throttle position sensor, a brake sensor (for example, a brake pedal position sensor, a brake cylinder pressure sensor, etc.), and the like. The driver controls 135 provide information to the controller 110 regarding the state of the driver including whether the driver is reacting (for example, attentive) to objects detected by the video camera 115 or the distance sensor 120. In some embodiments, the driver controls 135 include passive monitoring devices. In these embodiments, the driver controls 135 directly monitor the driver for attentiveness such as, for example, by having a camera or biometric sensor monitor the condition of the driver. In some embodiments, the driver controls 135 include a graphical user interface (GUI) or human-machine interface (HMI) that allow a driver to select preferences and modes for the pedestrian avoidance system 105.

Figure 2:
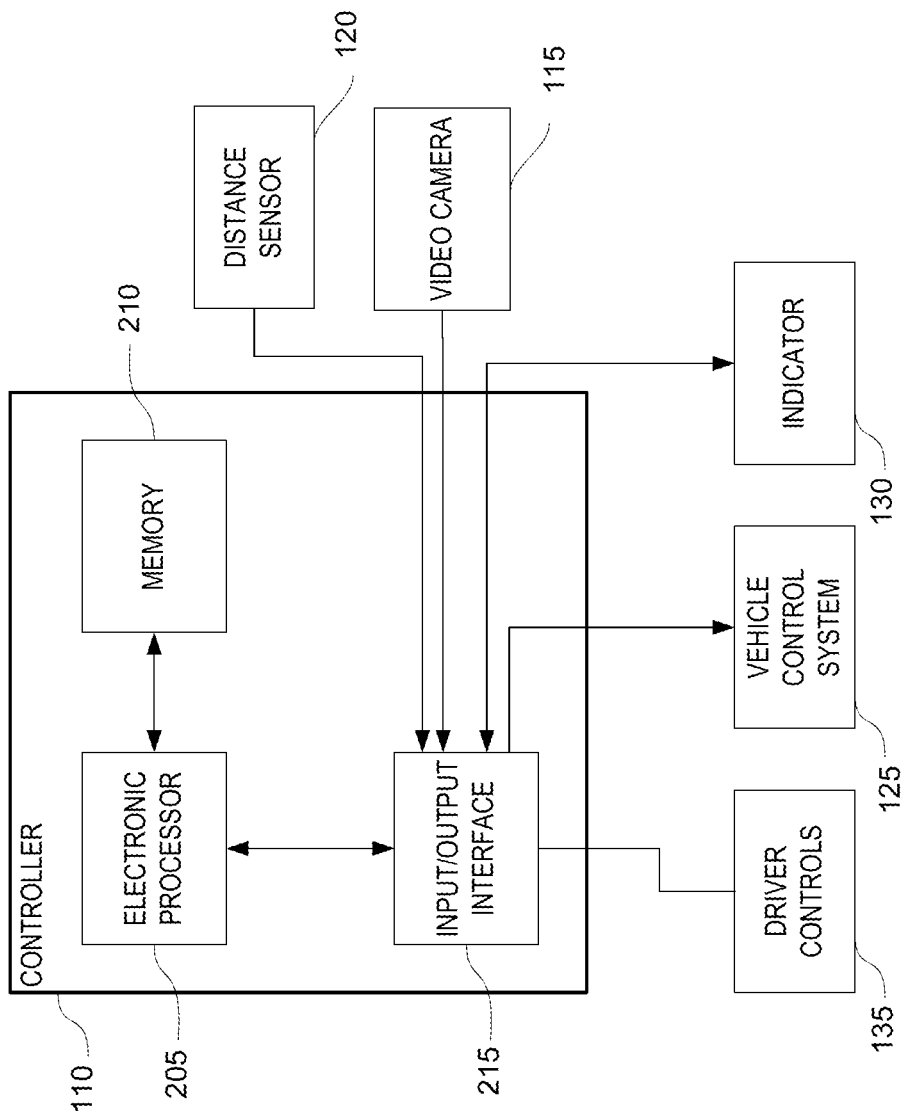
FIG. 2 is a diagram of a controller of the pedestrian avoidance system of FIG. 1 according to one embodiment.

FIG. 2 is a block diagram of the controller 110 of the pedestrian avoidance system 105 according to one embodiment. The controller 110 includes a plurality of electrical and electronic components that provide power, operation control, and protection to the components and modules within the controller 110. The controller 110 includes, among other things, an electronic processor 205 (such as a programmable electronic microprocessor, microcontroller, or similar device), a memory 210 (for example, non-transitory, machine readable memory), and an input/output interface 215. The controller 110 may be implemented in several independent controllers (for example, electronic control units) each configured to perform specific functions or sub-functions. Additionally, the controller 110 may include additional electronic processors, memory, application specific integrated circuits (ASICs), or field programmable gate arrays (FPGAs). The controller 110 and associated systems are configured to implement, among other things, the processes and methods described herein. In other embodiments, the controller 110 includes additional, fewer, or different components.

The electronic processor 205 is communicatively coupled to the memory 210 and executes instructions which are capable of being stored on the memory 210. The electronic processor 205 is configured to retrieve from memory 210 and execute instructions related to the methods of operation of the pedestrian avoidance system 105. The electronic processor 205 is communicatively coupled to the input/output interface 215. The input/output interface 215 is communicatively coupled to systems and hardware external to the controller 110. For example, the input/output interface 215 is communicatively coupled to the distance sensor 120, the video camera 115, the vehicle control system 125, the indicator 130, and the driver controls 135. In some embodiments, the input/output interface 215 includes drivers, relays, switches, and the like to operate or control the vehicle control system 125 and the indicator 130 based on instructions from the electronic processor 205. In some embodiments, the input/output interface 215 communicates with external systems and hardware by means of a protocol such as J1939 or a controller area network (CAN bus). In other embodiments, the input/output interface 215 communicates under other suitable protocols, including analog or digital signals, via direct wired or wireless connections, depending on the needs of the specific application.

In some embodiments, the distance sensor 120, the video camera 115, the vehicle control system 125, the indicator 130, and the driver controls 135 include hardware, software, and electronic components that include one or more processors, one or more memory modules including non-transitory computer-readable medium, one or more input/output interfaces, and various connections. As a consequence, each of the foregoing components may independently generate and process data before or during communication with the controller 110.

For example, in some embodiments, the video camera 115 receives video images and may process the video images to identify, classify, and track objects including pedestrians within the images. In these embodiments, the video camera 115 may send a signal to the controller 110 indicating the presence of the pedestrian independently from or without sending video images to the controller 110. In this embodiments, the video camera 115 may also send a signal indicative of a distance, position, and velocity of the pedestrian. In other embodiments, the controller 110 may receive the video images and may process the video images to identify, classify, and track objects. Similarly, in some embodiments, the distance sensor 120 may independently generate and process data before or during communication with the controller 110. In these embodiments, the distance sensor 120 detects the presence of the pedestrian, the distance to the pedestrian, the velocity of the pedestrian relative to the vehicle 100 and the like using internal programming and hardware. In these embodiments, the distance sensor 120 then communicates data indicative of this information to the controller 110.

FIGS. 3A-3B illustrate a flowchart of a method 300 of operating the vehicle 100 with the pedestrian avoidance system 105 according to one embodiment. In the method 300, the controller 110 receives a first signal (i.e., a camera signal) from the video camera 115 indicative of the presence of a pedestrian (block 305). In some embodiments, the video camera 115 may only send the signal indicative of the presence of the pedestrian when the video camera has analyzed the position, distance, velocity, or a combination of the aforementioned and determined that the pedestrian is in or approaching an area that presents a risk of collision with the vehicle 100. In other embodiments, the controller 110 determines if there is a risk of collision between the pedestrian and the vehicle 100 (block 310) based on the first signal received from the video camera 115 (for example, distance, position, and velocity of the pedestrian). In these embodiments, the controller 110 may also make the determination based on the current speed and direction of travel of the vehicle. The controller 110 may determine that a risk of collision is present when the above-listed factors indicate that a probability of collision with the pedestrian is above a predetermined threshold. When there is no significant risk of collision, the controller 110 restarts the method 300, and therefore, continues to monitor the video camera 115 for detection of pedestrians (block 315).

Conversely, when it is determined that there is a risk of collision, the controller 110 sends a signal (i.e., a notification signal) to the indicator 130 indicative of the risk of collision (block 320). After activating the indicator 130, the controller 110 monitors the driver controls 135 for a response from the driver (block 325). The controller 110 compares responses received from the driver controls 135 to a first set of thresholds that may be predetermined and stored in the memory 210 of the controller 110 (block 330). Each one of the responses received by the controller 110 may have an associated threshold. For example, one threshold may be a predetermined amount of angle change of the steering wheel (i.e., a steering angle threshold). Another threshold may be a predetermined amount of change of the steering angle (i.e., a steering angle gradient threshold). Another threshold may be a predetermined amount of braking (for example, braking pressure or brake pedal travel threshold). Yet another threshold may be a predetermined amount of throttle movement received by the controller 110 via a throttle signal that indicates a change in throttle position. If the response by the driver is above any one of the first set of thresholds, the controller 110 determines that the driver has reacted to the presence of the pedestrian and restarts the method (block 315).

In some embodiments, as part of the determination of whether a particular threshold of the first set of thresholds has been met, the controller 110 may determine whether the driver reaction is increasing or decreasing the risk of collision with the pedestrian. In such a case, if the driver reaction does not decrease the risk of collision (for example, when the steering angle change is in a direction toward the pedestrian), the controller 110 may consider that the driver reaction does not meet the particular threshold of the first set of thresholds. During monitoring of the driver controls 135, the controller 110 monitors for loss of the indication from the video camera 115 of the presence of the pedestrian (block 335). When the indication is no longer received from the video camera 115, the controller 110 may restart the method (block 315). This process is repeated over a first time period. For example, the controller 110 monitors for driver reaction and loss of pedestrian indication continuously during the first time period for response from the driver controls 135 (block 340). When the first time period for response from the driver controls 135 is expired, the controller 110 performs the next step of the method 300 as illustrated in FIG. 3B.

The controller 110 monitors the distance sensor 120 for a second signal indicative of the presence of the pedestrian (block 345). When the second signal indicates the presence of the pedestrian, the controller 110 confirms the presence of the pedestrian that has already been detected by the video camera 115. As described above, the second signal from the distance sensor 120 may also include information relating to the pedestrian such as, for example, distance, location, velocity, and others. When the presence of the pedestrian is not detected (block 350), the controller 110 restarts the method (block 315). Conversely, when the controller 110 determines that the presence of the pedestrian is detected by the distance sensor 120 (block 350), the controller 110 determines a course deviation (for example, a steering angle adjustment factor) from a current path of travel of the vehicle 100 based at least in part on the second signal and activates a second timer (block 355). In some embodiments, the course deviation is determined based on a combination of the first signal and the second signal. In some embodiments, the controller 110 also sends a signal to the vehicle control system 125 to prefill the brakes. Next, the controller 110 monitors the driver controls 135 for a response from the driver (block 360). The controller 110 determines whether there is one or more responses from the driver controls 135 and whether any of the responses are above a second set of thresholds (block 365). The second set of thresholds may be similar to the first set of thresholds. However, in some embodiments, the second set of thresholds are higher than the first set of thresholds. As a consequence, the controller 110 may require a greater level of response from the driver to restart the method due to the greater level of response needed as the vehicle 100 approaches the pedestrian.

Similar to the first set of thresholds, each one of the responses received by the controller 110 may have an associated threshold of the second set of thresholds. For example, one second threshold may be a predetermined amount of angle change of the steering wheel. Another second threshold may be a predetermined amount of change of the steering angle (i.e., a steering angle gradient). Another one of the second thresholds may be a predetermined amount of braking (for example, braking pressure or brake travel). If the response by the driver is above any one of the second set of thresholds, the controller 110 determines that the driver has reacted to the presence of the pedestrian and restarts the method (block 315). As part of the determination of whether a particular second threshold of the second set of thresholds has been met, the controller 110 may determine whether the driver reaction is increasing or decreasing the risk of collision with the pedestrian. In such a case, if the driver reaction does not decrease the risk of collision (for example, when the steering angle change is in a direction toward the pedestrian), the controller 110 may consider that the driver reaction does not meet the particular threshold of the second set of thresholds.

When the driver controls 135 have not yet indicated that the driver responses are above any one of the second set of thresholds, the controller 110 checks whether the video camera 115 and the distance sensor 120 still indicate the presence of the pedestrian (block 370). If either the video camera 115 or the distance sensor 120 no longer detect the pedestrian, the controller 110 restarts the method 300 (block 315). However, when the video camera 115 and the distance sensor 120 continue to the detect the pedestrian, the controller 110 continues to monitor the driver controls 135 for a second time period for response from the driver. For example, when the second time period for response has not expired (block 375), the controller 110 continues to monitor the driver controls 135 as illustrated in block 360. In some embodiments, the second time period for response is shorter than the first time period for response. As a consequence, the pedestrian avoidance system 105 reacts faster when the closing distance between the vehicle 100 and the pedestrian lessens. When the second time period for response from the driver controls 135 expires, the controller 110 applies the course deviation that was previously calculated (block 380). Once the course deviation has occurred, the controller 110 applies the brakes of the vehicle 100 via the driver controls 135 (block 385). In particular, the controller 110 may apply the course deviation using a steering angle adjustment or differential braking before applying the brakes to slow the vehicle 100. When the vehicle 100 completes the course deviation, the controller 110 may apply full or partial braking along the new course. In some embodiments, the course deviation occurs approximately along a straight line due to a sudden steering change. In other embodiments, the course deviation occurs along a curved path due to a more gradual steering change. In this case, the course deviation may have a smoother feel for a driver. The steps of the method 300 may be performed in alternative orders. Similarly, several of the steps of the method 300 are optional and may be performed in only some embodiments. In addition, the terms first and second do not necessarily indicate an order of operation or a timing sequence. Rather, these terms may be used simply to differentiate other terms. For example, a first signal and a second signal do not necessarily indicate an order of reception or transmission. In some situations, the second signal as discussed below, is received and processed prior in time to the first signal.

Figure 4:
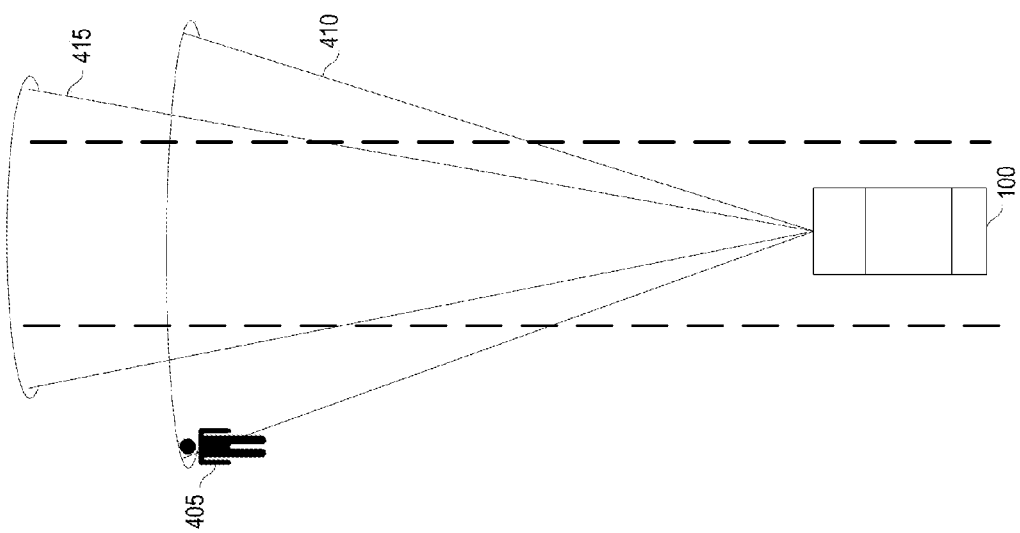
FIG. 4 is a diagram of a driving scenario with a pedestrian detected by a video camera of the pedestrian avoidance system of FIG. 1.

FIG. 4 graphically depicts a driving scenario where a pedestrian 405 is first detected within a field of view 410 of the video camera 115 of the vehicle 100. In the illustrated example, the pedestrian 405 is not detected within the field of view 415 of the distance sensor 120. This may occur when the pedestrian 405 is positioned to one side of the vehicle since the field of view 410 of the video camera 115 may be wider than the field of view 415 of the distance sensor 120. In this example, the pedestrian 405 may be on a sidewalk of a roadway. Once the pedestrian 405 is detected by the video camera 115, the video camera 115 sends a signal indicative of the presence of the pedestrian 405 to the controller 110 of the vehicle 100, and the controller 110 starts the method 300. In this example, the controller 110 will not determine that there is a risk of collision with the pedestrian 405 (at block 310), unless the pedestrian 405 starts moving in the direction of the path of travel of the vehicle 100. For example, a risk of collision is deemed to be present when the pedestrian 405 moves toward a center of the roadway. As described above, if the controller 110 does determine that there is a risk of collision based solely on the signal from the video camera 115, the controller 110 activates the indicator 130 and may restart the method 300 if the distance sensor 120 does not detect the pedestrian 405 (see blocks 310, 320, and 350).

Figure 5:
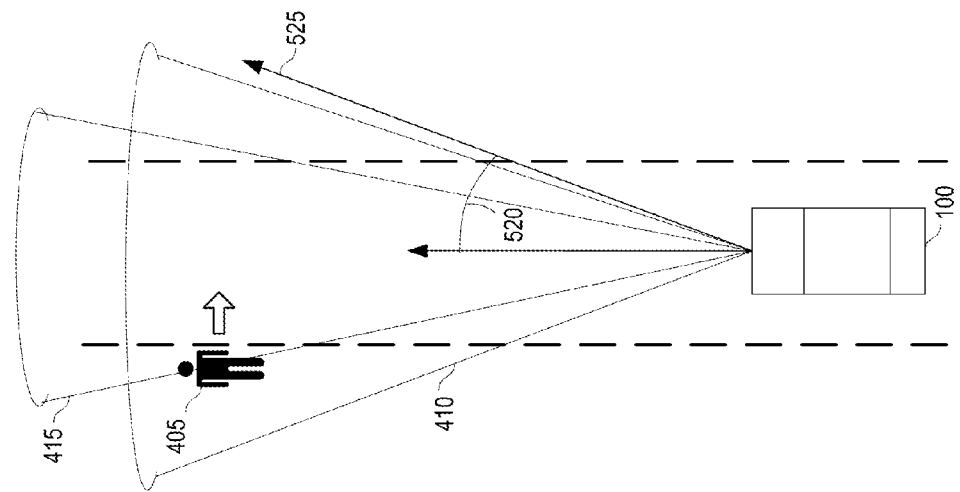
FIG. 5 is a diagram of a driving scenario with a pedestrian detected by both the video camera and a distance sensor of the pedestrian avoidance system of FIG. 1.

FIG. 5 graphically depicts another driving scenario that may occur subsequently to the driving scenario of FIG. 4. In the illustrated example, the pedestrian 405 is within the field of view 410 of the video camera 115 and the field of view 415 of the distance sensor 120. This traffic scenario may arise when the pedestrian 405 moves closer to the path of travel of the vehicle 100. For example, the pedestrian 405 may exit the sidewalk and begin crossing the roadway in front of the vehicle 100. When this occurs, the distance sensor 120 detects the pedestrian 405 and sends a signal to the controller 110 indicative of the presence of the pedestrian 405 (at block 350). The controller 110 determines the course deviation from the current path of travel of the vehicle 100 as illustrated by a deviation angle 520 and a new course trajectory 525. The deviation angle 520 and the new course trajectory 525 define a path of travel that will avoid a collision with the pedestrian 405 based on the location and velocity of the pedestrian 405 as determined by the distance sensor 120, and in some embodiments, based on the velocity of the vehicle 100. In some embodiments, a combination of the distance sensor 120 and the video camera 115 is used to determine the location and velocity of the pedestrian 405 and thus, be used to determine the deviation angle 520 and the new course trajectory 525. The controller 110 may continuously update the deviation angle 520 and the new course trajectory 525 while the second timer is active.

When the second time period for response expires without detecting a driver reaction, the vehicle 100 performs a course correction according to the last determined deviation angle 520 and new course trajectory 525 as illustrated in FIG. 6. As described above, once the new course trajectory 525 is achieved, the controller 110 may stop or slow the vehicle 100 using the vehicle control system 125.

Thus, embodiments of the invention provide, among other things, a collision avoidance system and a method of performing collision avoidance for a vehicle. Various features and advantages of the invention are set forth in the following claims.

What is claimed is:
1. A collision avoidance system for a vehicle, the collision avoidance system comprising:
   a video camera configured to detect a presence of a pedestrian;
   a distance sensor configured to detect the presence of the pedestrian;

a driver control configured to receive an input from a driver;

a vehicle control system configured to automatically maneuver the vehicle; and a controller including an electronic processor, the controller communicatively coupled to the video camera, the distance sensor, the driver control, and the vehicle control system, the controller configured to receive a first signal from the video camera indicative of the presence of the pedestrian, receive a second signal from the distance sensor indicative of the presence of the pedestrian, when the presence of the pedestrian is detected by both the video camera and the distance sensor, determine a course deviation from a current path of travel of the vehicle and activate a timer, wherein the timer is activated after the presence of the pedestrian is detected, when the driver control receives an input from the driver that is above a threshold, reset the timer, and when the driver input is below the threshold and the timer expires, apply the course deviation using the vehicle control system.

2. The collision avoidance system of claim 1, wherein the distance sensor is a radar or lidar sensor that is configured to sense the pedestrian within a narrower field of view than a field of view of the video camera.

3. The collision avoidance system of claim 1, wherein the driver control includes at least one from the group consisting of a steering angle sensor, a throttle position sensor, and a brake sensor.

4. The collision avoidance system of claim 1, wherein the vehicle control system includes a braking actuator and a steering controller.

5. The collision avoidance system of claim 1, wherein the controller is further configured to confirm the presence of the pedestrian based on the second signal before applying the course deviation.

6. The collision avoidance system of claim 1, wherein the controller is further configured to send a notification signal via an input/output interface indicating the presence of the pedestrian when the presence of the pedestrian is detected by the video camera and when there is a probability of collision with the pedestrian above another threshold.

7. The collision avoidance system of claim 1, wherein the controller is further configured to determine the course deviation from the current path of travel of the vehicle by determining a velocity of the pedestrian, a velocity of the vehicle, and a steering angle adjustment factor indicative of an angle of steering change that will result in the vehicle avoiding the pedestrian.

8. The collision avoidance system of claim 1, wherein the controller is further configured to detect the presence of the pedestrian and send a notification to an indicator indicative of the presence of the pedestrian in a first time period, to detect the presence of the pedestrian by both the video camera and the distance sensor and determine the course deviation in a second time period, and to apply the course deviation in a third time period.

9. The collision avoidance system of claim 8, wherein the controller is further configured to activate a brake prefill via the vehicle control system during the second time period.

10. The collision avoidance system of claim 1, wherein the controller is configured to apply the course deviation by using differential braking via the vehicle control system.

11. A method of performing collision avoidance for a vehicle, the method comprising:

receiving, at a controller, a first signal from a video camera indicative of a presence of a pedestrian, receiving, at the controller, a second signal from a distance sensor indicative of the presence of the pedestrian, when the presence of the pedestrian is detected by both the video camera and the distance sensor, determining, at the controller, a course deviation from a current path of travel of the vehicle and activate a timer, wherein the timer is activated after the presence of the pedestrian is detected by both the video camera and the distance sensor, when a driver control receives an input from the driver that is above a threshold, resetting the timer, and when the driver input is below the threshold and the timer expires, applying the course deviation using a vehicle control system.

12. The method of performing collision avoidance according to claim 11, wherein receiving the first signal occurs before receiving the second signal.

13. The method of performing collision avoidance according to claim 11, wherein receiving the input from the driver that is above a threshold includes at least one from the group consisting of receiving a steering angle signal that is above a steering angle threshold, receiving a braking signal that is above a braking threshold, and receiving a throttle signal that is above a throttle position threshold.

14. The method of performing collision avoidance according to claim 11, wherein applying the course deviation using the vehicle control system includes at least one from the group consisting of automatically applying a braking actuator and automatically applying a steering angle adjustment.

15. The method of performing collision avoidance according to claim 11, wherein applying the course deviation only occurs when both the first signal and the second signal still indicate the presence of the pedestrian when the timer expires.

16. The method of performing collision avoidance according to claim 11, the method further comprising sending a notification signal via an output interface indicating the presence of the pedestrian when the presence of the pedestrian is detected by the video camera and when there is a probability of collision with the pedestrian above another threshold.

17. The method of performing collision avoidance according to claim 11, wherein determining the course deviation from the current path of travel of the vehicle includes determining a velocity of the pedestrian, a velocity of the vehicle, and a steering angle adjustment factor indicative of an angle of steering change that will result in the vehicle avoiding the pedestrian.

18. The method of performing collision avoidance according to claim 11, the method further comprising detecting the presence of the pedestrian and sending a notification to an indicator in a first time period, detecting the presence of the pedestrian by both the video camera and the distance sensor and determining the course deviation in a second time period, and applying the course deviation in a third time period.

19. The method of performing collision avoidance according to claim 18, the method further comprising activating a brake prefill via a vehicle control system during the second time period.

20. The method of performing collision avoidance according to claim 11, wherein applying the course deviation includes using differential braking via a vehicle control system.

21. A collision avoidance system for a vehicle, the collision avoidance system comprising:
- a sensor configured to detect a presence of a pedestrian;
- a driver control configured to receive an input from a driver;
- a vehicle control system configured to automatically maneuver the vehicle; and
- a controller including an electronic processor, the controller communicatively coupled to the sensor, the driver control, and the vehicle control system, the controller configured to
  - receive a signal from the sensor indicative of the presence of the pedestrian,
  - determine a probability of collision between the pedestrian and the vehicle;
  - when the probability of collision is greater than a threshold, determine a course deviation from a current path of travel of the vehicle and activate a timer, wherein the timer is activated after determining a probability of collision between the pedestrian and the vehicle,
  - when the driver control receives an input from the driver that is above another threshold, reset the timer, and
  - when the driver input is below the threshold and the timer expires, apply the course deviation using the vehicle control system.

\* \* \* \* \*